United States Patent
Mignano

(10) Patent No.: US 7,461,734 B2
(45) Date of Patent: Dec. 9, 2008

(54) SWITCHER FOR PRODUCT SUPPLY LINES AND A MACHINE EQUIPPED WITH THE SWITCHER

(75) Inventor: Paolo Mignano, Correggio (IT)

(73) Assignee: Mechatronic System Company S.r.l., Castelnovo Di Sotto (IT)

( * ) Notice: Subject to any disclaimer, the term of this patent is extended or adjusted under 35 U.S.C. 154(b) by 177 days.

(21) Appl. No.: 11/657,977

(22) Filed: Jan. 25, 2007

(65) Prior Publication Data
US 2007/0181401 A1   Aug. 9, 2007

(30) Foreign Application Priority Data
Feb. 6, 2006   (EP) .................................. 06425061

(51) Int. Cl.
*B65G 47/26* (2006.01)
(52) U.S. Cl. .................. 198/442; 198/353; 198/355
(58) Field of Classification Search ............... 198/442, 198/587, 588, 594, 595, 353, 355
See application file for complete search history.

(56) References Cited

U.S. PATENT DOCUMENTS

| 3,193,078 | A |   | 7/1965  | Amenta et al. |
| 4,147,248 | A | * | 4/1979  | Kurczak et al. .............. 198/358 |
| 4,616,745 | A | * | 10/1986 | Hartness ...................... 198/442 |
| 4,723,649 | A | * | 2/1988  | Hartness et al. ............. 198/442 |
| 5,174,430 | A |   | 12/1992 | Ebira |
| 5,186,306 | A | * | 2/1993  | Sjostrand ..................... 198/442 |
| 5,944,165 | A | * | 8/1999  | Mannlein et al. ............. 198/442 |
| 6,772,872 | B2| * | 8/2004  | Spangenberg et al. ....... 198/442 |
| 2002/0139638 | A1 |   | 10/2002 | Ronchi |
| 2006/0175179 | A1 | * | 8/2006 | Christman et al. .......... 198/436 |

FOREIGN PATENT DOCUMENTS

| EP | 0 480 436 A2 | 4/1992 |
| EP | 1 245 512 A2 | 10/2002 |

* cited by examiner

*Primary Examiner*—Mark A Deuble
(74) *Attorney, Agent, or Firm*—Pearne & Gordon LLP

(57) ABSTRACT

The switcher comprises a support frame (2), a guide channel (13) rotatably mobile about a fixed axis (8) and a telescopic channel (15) located at an end (14) of the guide channel (13) and being slidable with respect thereto. The switcher (1) comprises a support element (6), connected to the guide channel (13), having a first end (7) hinged to a first transversal portion (4) of the frame (2) at the fixed axis (8), a first cursor (16) slidable on the support element (6) and connected to the telescopic channel (15), a second cursor (17) slidable on the support element (6) and a con rod (21) having a first end (22) hinged to the first transversal portion (4) of the frame (2) and a second end (24) hinged to the second cursor (17). The invention also relates to a machine for separating or grouping products provided with the switcher (1).

15 Claims, 3 Drawing Sheets

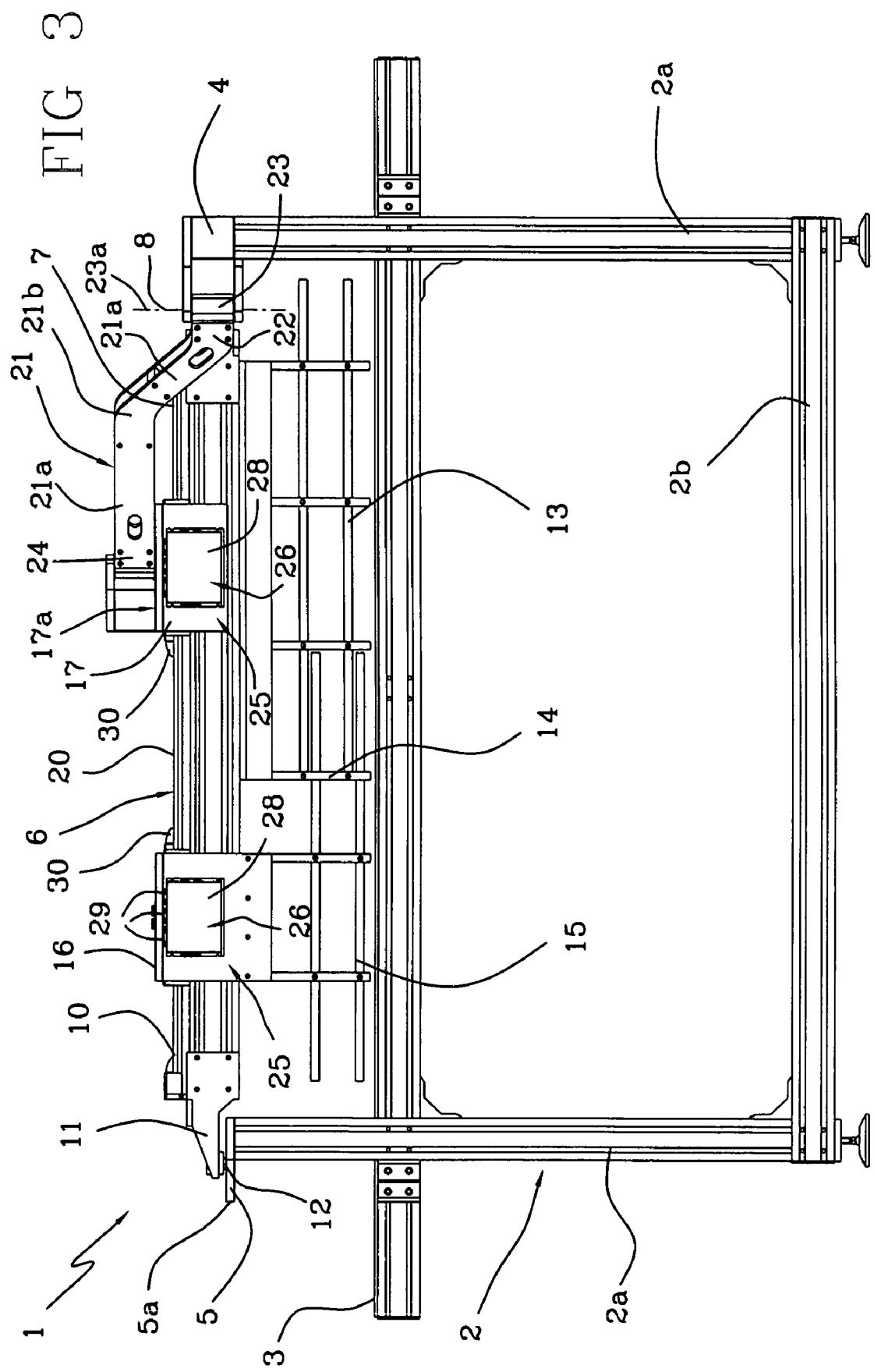

SWITCHER FOR PRODUCT SUPPLY LINES AND A MACHINE EQUIPPED WITH THE SWITCHER

The invention relates in particular to the field of separation of products and entraining thereof onto several lines; the products are generally of the types including bottles, flagons, cans, brick-shaped containers and other single packages used in the food and drinks industry, and for packing and bottling of food, chemical and pharmaceutical products.

Alternatively, switcher devices can be used inversely in order to group products, or for entraining objects coming from several lines into one single line and destination.

As is known, these devices are especially used upstream of control and selection systems.

The products to be separated advance on a conveyor belt or other support and are initially channelled into a guide conduit, rotatably constrained, at an end thereof, to the support structure on the product input side. The guide channel is thus caused to follow a circular trajectory about the point of constraint. A telescopic channel is hinged at the opposite end of the guide channel, which telescopic channel directs and accompanies the products into the respective output conduits.

The telescopic channel is contained internally of a quadrilateral structure located horizontally above the belt and having two parallel sides and two perpendicular sides at the edges of the belt.

The telescopic channel is powered by drive means, comprising a cursor, to which the telescopic channel is constrained, and a rod slidably connected to the two sides of the quadrilateral structure which sides are parallel to the edges of the support belt along which rod the cursor runs.

The rod runs horizontally, nearing and distancing from the output conduits, so that the telescopic channel is lengthened or shortened.

The movement of the cursor along the rod produces a transversal movement of the telescopic channel with respect to the belt and consequently causes the guide channel to rotate, which guide channel, being connected to the telescopic channel, is forced to follow the movements thereof.

The operating principle for the product separation is therefore based on the contemporaneous transversal and longitudinal motion of the telescopic channel, controlled by the means for movement.

The drive means further comprise mechanisms for managing movements of the rod and cursor, such as for example to electric motors located along two perpendicular sides of the quadrilateral structure, which motors command two endless screws.

A device such as the one described above is very complex from the structural, constructional and applicational points of view.

It requires a support structure having considerable dimensions, and being made up of numerous elements which require the use of mechanical gearings of various types, leading to considerable constructional complexity and excessive structural dimensions.

The use of various drive systems, located at different points in the structure, leads to a large amount of cabling, which can obstruct the movement of the device guides as well as adding to design complexity. Prior art devices in use are also very noisy and the presence of mechanical chains causes a loss of energy efficiency as well as a greater power demand.

The aim of the present invention is to obviate the above-described drawbacks present in the prior art.

The main aim of the present invention is to provide an alternative solution which is constructionally simpler and less massive of a switcher for product lines comprising the technical characteristics of one or more of the appended claims, and to provide a machine for separating or grouping products.

A further aim of the present invention is to provide a switcher for product input lines which is simpler from the applicational point of view, having an optimised technical design and a drastically reduced number of components.

Further aims of the present invention are: less cabling required in comparison with known and used switchers, reduction of the noise and increase in average time between faults and therefore an increase in reliability.

Finally, other aims of the invention are the increase in production, the ability to move heavier products and an energy saving.

A non-exclusive preferred embodiment will now be described, by way of non-limiting example, of a switcher for product input lines and a machine for separating or grouping products, according to the invention and accompanied by the figures of the drawings, in which:

FIG. 3 is a side elevation of the switcher of FIG. 1, with some parts removed in order better to comprehend the figure.

Figure 1:
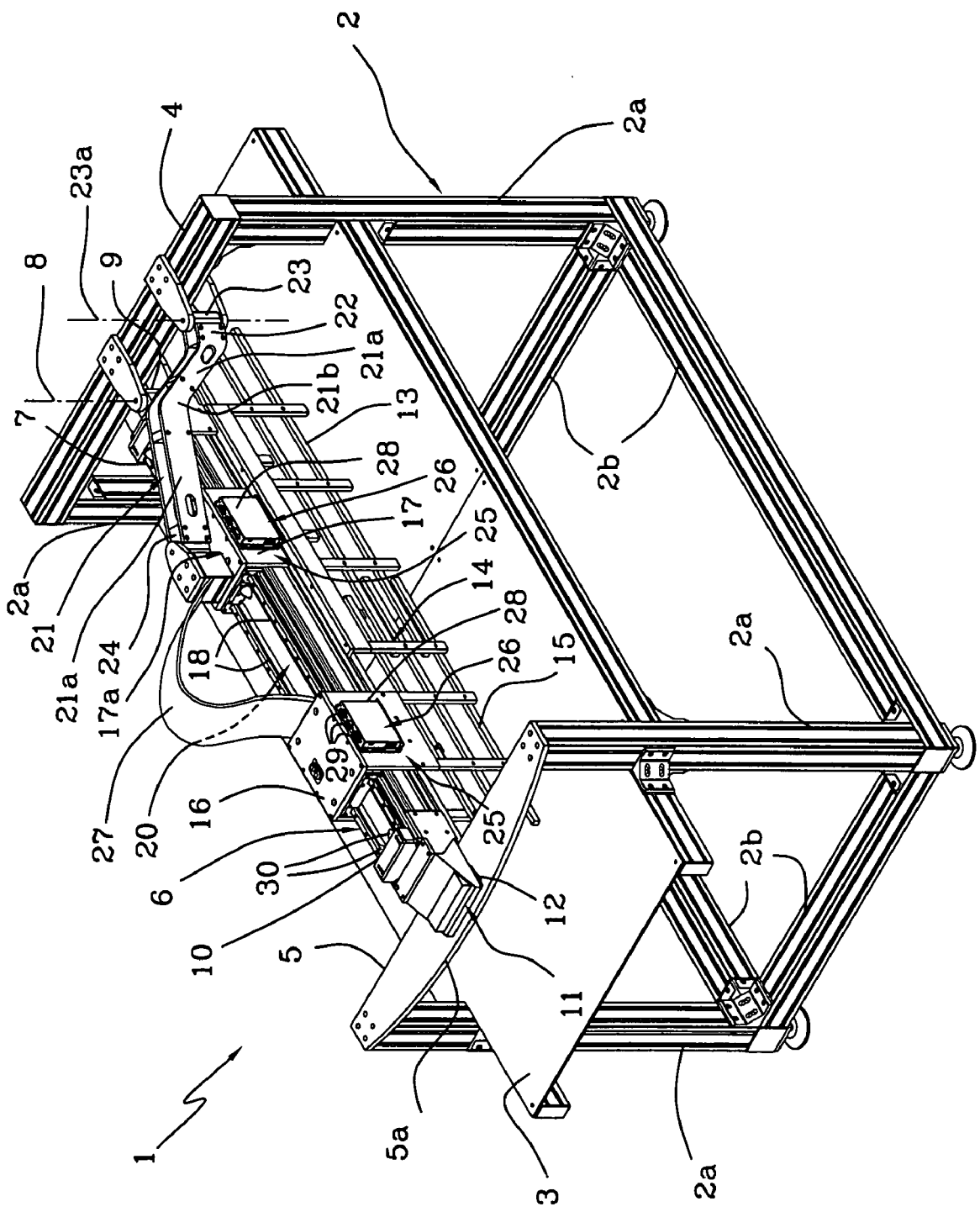
FIG. 1 is a perspective view of a switcher of a first configuration of the invention.

With reference to the figures of the drawings, 1 denotes in its entirety a switcher for product supply lines comprising a frame 2 bearing a support and a rest plane 3 for the products. The rest plane 3 can be a conveyor belt which moves the products, or a fixed panel on which the products advance by being pushed by products situated behind, or it can be a roller table which by rotating cause the products to advance.

The frame further comprises four legs 2a united inferiorly by four stiffening bars 2b. Superiorly a first transversal portion 4 and a second transversal portion 5, parallel to one another, each connect a pair of adjacent legs 2a.

The first and the second transversal portions 4, 5 are constituted by straight elements. The second transversal portion 5 exhibits a side 5a, which is a more external side, which is arched, having a convexity thereof turned towards the outside of the frame 2.

A self-bearing support element 6 is connected to the first transversal portion 4. In particular, the support element 6 is rotatably constrained, by an end thereof, to the first transversal portion 4 and rotates about a fixed axis 8 with respect to the frame 2. The fixed axis 8 is the hinge axis of a vertical pivot 9 which connects the support element 6 to the first transversal portion 4 of the frame 2.

The support element 6 preferably exhibits a longitudinal axis 6a having a straight development.

The second end 10 of the support element 6 exhibits rest means 11 by which the support element 6 is in contact with the second transversal portion 5 of the frame 2.

The rest means 11 comprise at least a sliding system 12, such as for example a bearing system, with which the second end 10 of the support element 6 slides along the second transversal portion 5, in a circular trajectory.

The support element 6, being hinged at the pivot 9 at the first transversal portion 4 of the frame 2, is constrained to describe a circular trajectory along an arc of circumference.

A guide channel 13, internally of which the products slide, is connected to the support element 6. Preferably the guide channel 13 is constrained below the support element 6. Advantageously the guide channel 13 exhibits a straight longitudinal axis development and is aligned with the overlying support element 6. As the guide channel 13 is rigidly constrained to the support element 6 it follows all movement, also rotating about the axis 8 along the same circular trajectory. A telescopic channel 15 is located at an end 14 of the guide channel 13. The telescopic channel 15 is a prolongation of the guide channel 13 and is thus located at the end 14 of the guide channel 13 further from the rotation axis 8. In particular, in the preferred configuration illustrated in the figures of the drawings, the telescopic channel 15 is located at the end 14 of the guide channel 13 opposite the product input end. Consequently the support element 6 is superposed and aligned to the telescopic channel 15 but is not rigidly connected thereto. The telescopic channel 15 is able to translate longitudinally with respect to the guide channel 13, running rigidly below the support element 6.

During the displacement of the support element 6 and therefore the guide channel 13, the telescopic channel 15 can lengthen, accompanying the product up to its destination, preferably moving forward at the same speed thereas.

The switcher 1 further comprises a first cursor 16 and a second 17 cursor, 25 both located in contact with and above the support element 6. The first cursor 16 and the second cursor 17 are slidably mobile along the support element 6, powered by the means for movement.

Advantageously the means for movement comprise a linear motor; the support element 6, the first cursor 16 and the second cursor 17 constitute the linear motor.

In particular, the support element 6 comprises a plurality of permanent magnets 18 aligned along the longitudinal development thereof and positioned on the upper surface thereof.

A coil 19 is located internally of each cursor 16, 17, which coil 19 interacts with the permanent magnets 18 present on the support element 6. The permanent magnets 18 define a straight track 20 along which the coils 19, and therefore the cursors 16 and 17, run. The cursors 16 and 17 are longitudinally aligned along the support element 6 and, advantageously, the first cursor 16 is closer to the second end 10 of the support element 6, while the second cursor 17 is closer to the first end 7 of the support element 6. The functioning of a linear motor is based on the interaction between the induced magnetic field created by the current circulating internally of the coil and the magnetic field generated by the permanent magnets. Following the interaction of attraction and repulsion between the two magnetic fields, the coils 19 present internally of the cursors 16 and 17 slide on the track 20 of permanent magnets 18.

The telescopic channel 15 is constrained to the first cursor 16 which, sliding along the track 20 of permanent magnets 18, causes the translation of the telescopic channel 15.

A con rod 21 is located by a side of the support element 6, which con rod 21 has a first end 22 hinged, by a pivot 23, to the first transversal portion 4 of the frame 2, and a second end 24 which is hinged to the second cursor 17.

Figure 2:
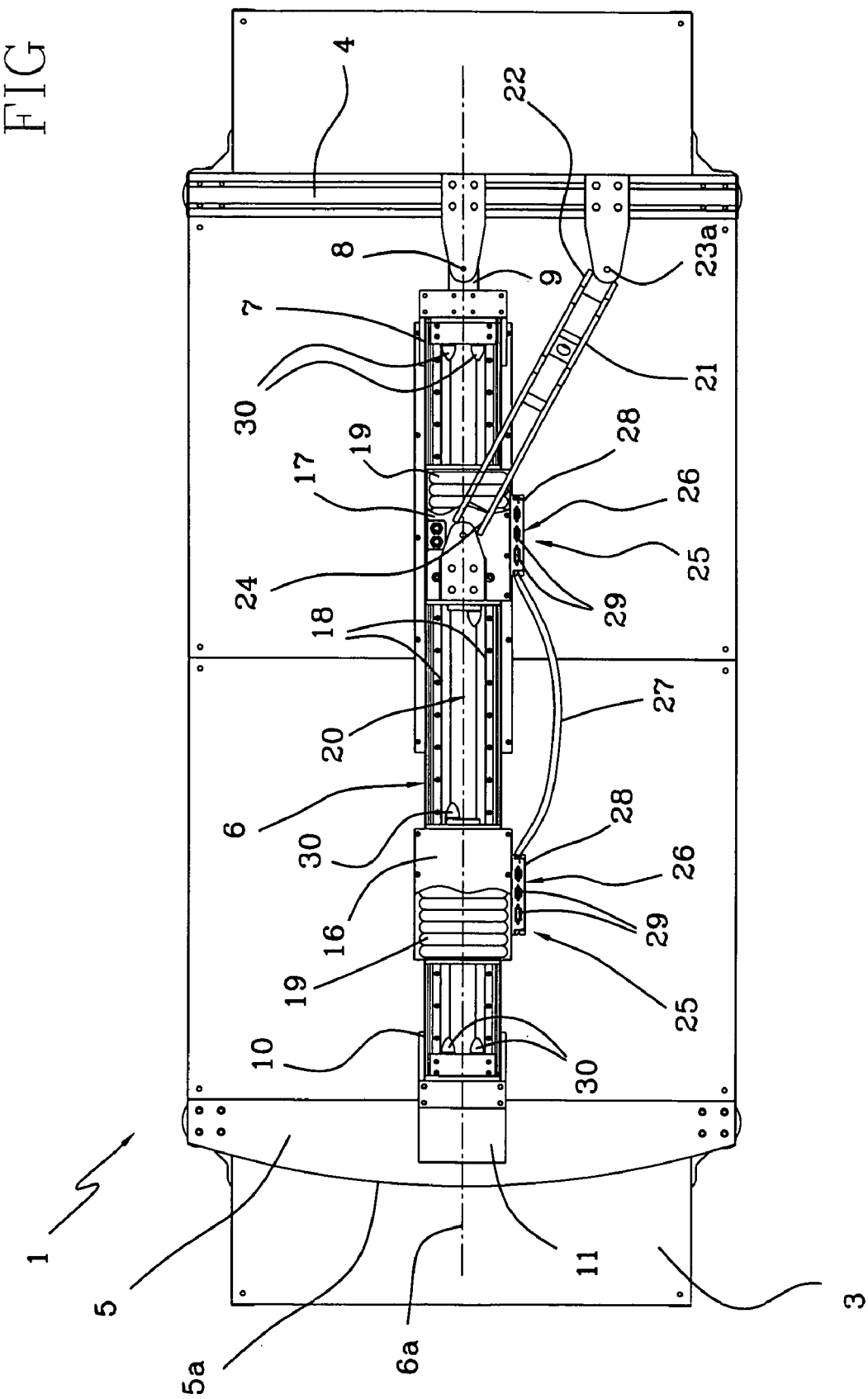
FIG. 2 is a plan view from above of a second configuration of the switcher of the present invention, with some parts removed.

Preferably the con rod 21 is connected to an upper portion 17a of the second cursor 17, and the first end 22 and the second end 24 of the con rod 21 are situated at two different heights. The lateral profile of the con rod 21, therefore, exhibits two straight tracts 21a connected by an elbow 21b having a concavity facing the rest plane 3, as can be seen in FIGS. 1 and 3. FIG. 2 shows that the con rod 21, seen from above, is straight.

The con rod 21 rotates about the hinge axis 23a of the pivot 23 connecting it to the frame 2.

In plan view, the con rod 21 has a longitudinal development which is smaller than the length of the support element 6 and, seen from above, is therefore inclined with respect to the longitudinal axis 6a of the support element 6.

The sliding of the second cursor 17 along the tract 20 is limited by the length of the con rod 21. Therefore, as the second cursor 17 is maintained at a fixed distance from the frame 2 following connection with the con rod 21, the linear motion of the second cursor 17 along the track 20 is translated into a circular motion of the support element 6 about the hinge axis 8 of the pivot 9. The coil 19 of the second cursor 17, as it moves along the track 20 of permanent magnets 18, causes the linear motor, the guide channel 13 and the telescopic channel 15 to rotate about the hinge axis 8, laterally displacing the products which advance along the guide channel 13. With respect to the frame 2, the second cursor 17 describes a movement which is a composition of the straight motion along the track 20 and the circular motion about the hinge axis 23a about which the con rod 21 rotates.

The movement of the two cursors 16 and 17 is synchronised so as to lengthen or retract the telescopic channel 15 in accordance with positions of the various output conduits, according to the angular position of the support element 6, i.e. the linear position of the first cursor 16 on the track 20.

Control and movement of the two cursors 16 and 17 is realised by means for actuating 25. The means for actuating 25 generally comprise a pair of operation drives 26 in mutual communication by means of a flexible structure 27 and applied directly on the mobile parts of the linear motor, i.e. the two cursors 16 and 17. Each drive 26 comprises a panel 28 externally exhibiting means for electrical coupling, such as connectors 29, for externally interfacing the coils 19. Preferably each means for activating comprises an encoder, not illustrated, for commanding and controlling the movement and the position of the two coils 19.

Each drive 26 is applied externally to a respective cursor 16, 17, on the upper surface or on one of the two lateral surfaces parallel to the axis 6a, according to need.

In the enclosed figures of the drawings, the drives 26 are situated on the lateral surface of the cursors 16 and 17.

Each cursor 16, 17 exhibits, on the lateral surfaces perpendicular to the longitudinal axis 6a of the guide element 6, at least an end-run element 30, for preventing impacts between the two cursors 16, 17 and between the two cursors 16, 17 and the structural parts located at the two ends 7 and 10 of the support element 6.

The switcher for supply lines of the invention can alternatively be used inversely, removing products from several lines to entrain them towards a single output channel. The products in arrival are subdivided into several input conduits, and a removed by the telescopic channel 15, cross the guide channel 13 and reach a single output channel.

The switcher device of the invention is generally mounted on lines that select products or which perform filling, packing or quality control operations on the product.

In particular, the lines include a machine, not illustrated, for separating products generally comprising at least a product supply line, a plurality of output conduits and an a switcher device 1 according to what is described in the preferred embodiment located between the supply line and the output conduits.

Alternatively a machine (not illustrated) can be provided for grouping products, which comprises a plurality of product supply lines, at least a product output line, and a switcher device 1 according to what is described in the alternative configuration (not illustrated) or functioning inversely, located between the product supply lines and the output conduit.

A switcher for supply lines according to the present invention enables a considerable structural and applicational simplification of the whole device to be made.

It also enables the frame volume to be reduced and optimises the technical design, thanks to the reduction in the number of components required.

The smaller number of components also leads to an increase in MTBF, i.e. it improves the apparatus' reliability.

The application of the direct linear motor obviates mechanical chains and uses only one con rod as a moving organ, thus offering important advantages, such as improvement in system performance, improved production and energy saving, as well as a reduction in apparatus noise levels.

With respect to known and used switchers, with the switcher of the present invention, and in equal power conditions, a better performance is obtainable and greater power is available for moving heavier products.

The special positioning of the mobile coils requires only a short cable tract which normally is made using chain cable or, preferably in order to reduce noise and mass further as well as increasing the compactness of the device, self-bearing cable ribbon for the flexible structure 27. It is therefore possible to obtain a considerable lightening of the cabling, using a solution which includes the possibility of connecting and directly managing the sensors by means of a pair of drives, operatively simpler and more precise, directly integrated on the mobile coils.

The linear motor also achieves the double aim of controlled movement and self-bearing main mechanical structure, thus considerably simplifying the whole device which is very compact, and can be managed as if it were a single component. The rated and peak power of the linear motor, combined with the transmission ratio of the con rod, enable high production values to be attained even where the masses to be moved are large.

The invention claimed is:

1. A switcher for product supply lines, comprising:
   a support frame (2);
   at least a guide channel (13) internally of which products move, which guide channel (13) is rotatably mobile about an axis (8) which axis (8) is fixed with respect to the frame (2);
   a telescopic channel (15), internally of which the products move, which is located at an end (14) of the guide channel (13) and is slidably mobile with respect to the guide channel (13);
   a rest plane (3) for the products which move internally of the guide channel (13) and the telescopic channel (15);
   characterised in that it further comprises:
   a support element (6), connected to the guide channel (13), having a first end (7) hinged to a first transversal portion (4) of the frame (2) by means of a pivot (9) through which passes the axis (8) about which the guide channel (13) rotates;
   a first cursor (16) which is slidably mobile on the support element (6) and which is connected to the telescopic channel (15);
   a second cursor (17) which is slidably mobile on the support element (6);
   a con rod (21) having a first end (22) hinged to the first transversal portion (4) of the frame (2) and a second end (24) hinged to the second cursor (17).

2. The switcher of claim 1, characterised in that the support element (6) and the first cursor (16) and the second cursor (17) constitute a linear motor.

3. The switcher of claim 1, characterised in that the support element (6) comprises a plurality of permanent magnets (18) aligned along a longitudinal development of the support element (6).

4. The switcher of claim 3, characterised in that the plurality of permanent magnets (18) define a track (20).

5. The switcher of claim 4, characterised in that the first cursor (16) comprises a coil (19) interacting with the permanent magnets (18) of the support element (6) in order to slide on the track (20), causing a lengthening or a shortening of the telescopic channel (15) with respect to the guide channel (13).

6. The switcher of claim 4, characterised in that the second cursor (17) comprises a coil (19) interacting with the permanent magnets (18) of the support element in order to slide on the track (20), causing, following interaction with the con rod (21), a rotation of the support element (6) about the axis (8) passing through the pivot (9).

7. The switcher of claim 1, characterised in that the support element (6) exhibits a straight development.

8. The switcher of claim 1, characterised in that the guide channel (13) exhibits a straight development.

9. The switcher of claim 8, characterised in that the telescopic channel (15) is a prolongation of the guide channel (13).

10. The switcher of claim 9, characterised in that the guide channel (13) and the telescopic channel (15) are hung below the support element (6).

11. The switcher of claim 1, characterised in that the support element (6) exhibits a second end (10) which is provided with rest means (11).

12. The switcher of claim 11, characterised in that the rest means (11) comprise at least a sliding system (12) by means of which the second end (10) of the support element (6) slides on a second transversal portion (5) of the frame (2), parallel to the first transversal portion (4).

13. The switcher of claim 1, characterised in that the rest plane (3) is positioned inferiorly of the guide channel (13) and the telescopic channel (15).

14. A switcher machine, comprising at least a supply line for products and a plurality of output conduits for the products, characterised in that it comprises a switcher (1) as in claim 1, located between the supply line and the plurality of output conduits.

15. A machine for grouping products, comprising a plurality of product supply conduits and at least an output line of the products, characterised in that it comprises a switcher (1) as in claim 1, located between the plurality of supply conduits and the output line.

* * * * *